Jan. 9, 1962 F. W. HACKER 3,016,128
JOINT CONSTRUCTION FOR CONVEYOR HOUSING
Filed Oct. 13, 1958 2 Sheets-Sheet 1

INVENTOR.
FREDERICK W. HACKER
BY
Attorneys

Jan. 9, 1962  F. W. HACKER  3,016,128
JOINT CONSTRUCTION FOR CONVEYOR HOUSING
Filed Oct. 13, 1958  2 Sheets-Sheet 2

INVENTOR.
FREDERICK W. HACKER
BY
Attorneys

United States Patent Office 3,016,128
Patented Jan. 9, 1962

---

3,016,128
JOINT CONSTRUCTION FOR CONVEYOR HOUSING
Frederick W. Hacker, Kankakee, Ill., assignor, by mesne assignments, to A. O. Smith Harvestore Products, Inc., Kankakee, Ill., a corporation of Delaware
Filed Oct. 13, 1958, Ser. No. 766,978
5 Claims. (Cl. 198—213)

This invention relates to a joint construction for a conveyor housing.

In a conveying system, a conveyor member, such as an auger or the like, is disposed within a generally tubular housing and moves material within the housing from one location to another. If the material is to be moved a substantial distance, the housing may be fabricated in a series of sections which are connected in an end-to-end relation and the adjacent ends of the sections are secured together by a clamp or coupling. In many cases, the direction of flow of the material is changed to either move the material to a higher level or convey the material to a lower level or change the direction of flow in a horizontal plane. To accommodate these changes in direction, the housing joints must be movable or adjustable to permit relative movement of the housing sections in both vertical and horizontal planes.

The present invention is directed to a joint structure for a conveyor housing which is of simple construction and is readily installed. According to the invention, the ends of the housing sections, which house the auger, are provided with external flanges and are disposed in spaced relation. A generally U-shaped strap covers the space between the ends of the housing sections and is provided with a channel-shaped cross section. The flanges of the channel-shaped strap are disposed longitudinally outward of the flanges on the housing sections to restrict longitudinal movement of the housing sections. The upper free ends of the U-shaped strap are attached together by a connecting bar to complete the joint construction.

The present joint construction for the housing sections is of simple construction and is readily installed with the housing sections to enclose the gap between the ends thereof. The joint structure may be used for any type of directional deviation of the conveyor housing sections, and only one standard joint structure is employed regardless of whether the housing sections are disposed in axial alignment or deviate in either a vertical or horizontal plane. The joint structure eliminates the need for cutting the ends of the housing sections to accommodate a directional change.

Other objects and advantages of the invention will appear in the course of the following description.

The drawings illustrate the best mode presently contemplated of carrying out the invention.

Figure 1:
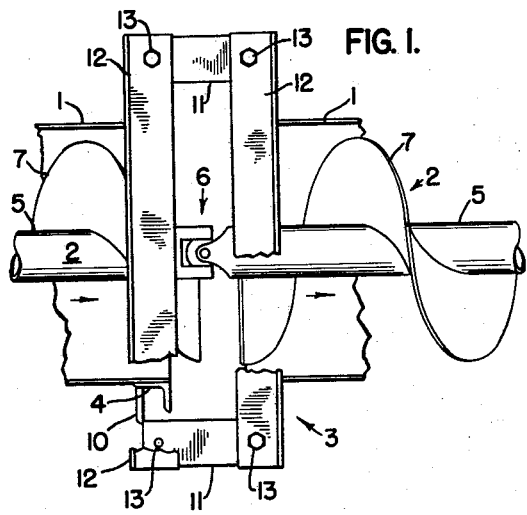
FIGURE 1 is a top plan view of the conveyor housing joint construction with parts broken away.

The drawings illustrate a pair of conveyor housing sections 1 which are disposed in substantially end-to-end relation and are adapted to house an auger 2 which conveys a material in the direction of the arrows shown in the drawings. The housing sections are supported above the ground or foundation by a series of supports, not shown, and the adjacent ends of the housing sections 1 are secured together by a clamping unit 3.

The housing sections 1 are provided with an open top and have a generally U-shaped cross section. The adjacent ends of the housing sections 1 are spaced apart and are provided with external flanges 4 which extend outwardly from the respective housing sections adjacent the ends thereof.

The auger 2 consists of a plurality of shafts 5 which are connected together by a universal joint 6 located at the joint between the ends of the housing sections 1. Each shaft 5 carries a spiral flight 7 which serves to convey the stored material in the direction of the arrow.

It is contemplated that a single auger could be employed in place of the several auger sections if the housing sections 1 are axially aligned.

The clamping unit 3 comprises a generally U-shaped strap 8 which is shaped to generally complement the outer surface of the housing sections 1. The strap 8 is provided with a web portion 9 which covers the space or joint between the ends of the housing sections 1 and a pair of inwardly extending flanges 10 which are disposed outwardly of the corresponding end flanges 4 on the housing sections 1. The flanges 10 prevent longitudinal displacement of the housing sections.

Each upper or free end of the U-shaped strap 8 is provided with a plate 11 which extends laterally outward from the respective end of the strap. Tht plates 11 are connected together by a pair of angle bars 12 which extend between the plates 11 and are connected to the respective plates by bolts 13. The bars 12 are located adjacent the side edges of the strap 8 and thereby have the additional function of adding stability to the ends of the open top housing sections. It is contemplated that a single plate extending across the width of the strap 8 could be used in place of the two bars 12.

Figure 2:
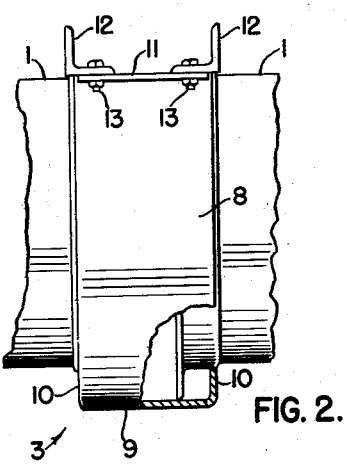
FIG. 2 is a side elevation of the joint construction shown in FIGURE 1, with parts broken away in section.
Figure 3:
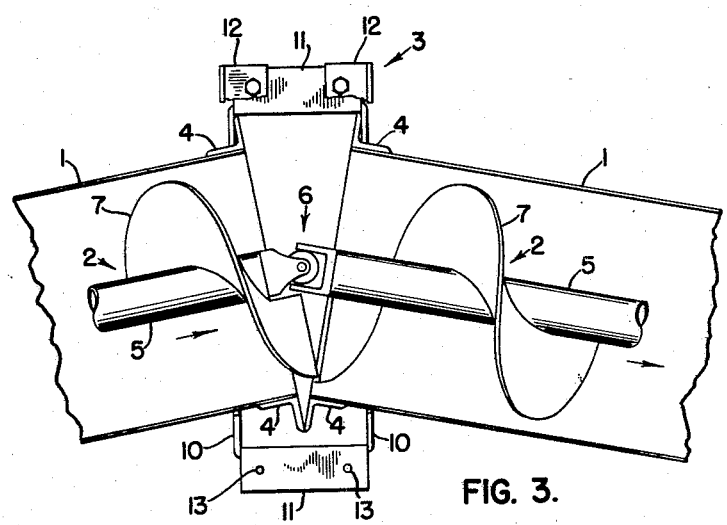
FIG. 3 is a top plan view of the joint construction between conveyor housing sections with the housing sections being disposed out of axial alignment in a horizontal plane.
Figure 4:
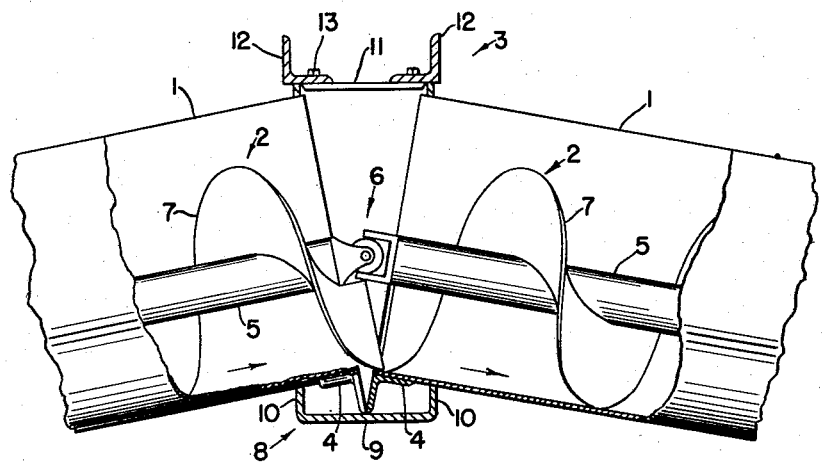
FIG. 4 is a vertical section taken through the joint with the conveyor housing sections disposed out of axial alignment in a vertical plane and the material flow being to a lower elevation.
Figure 5:
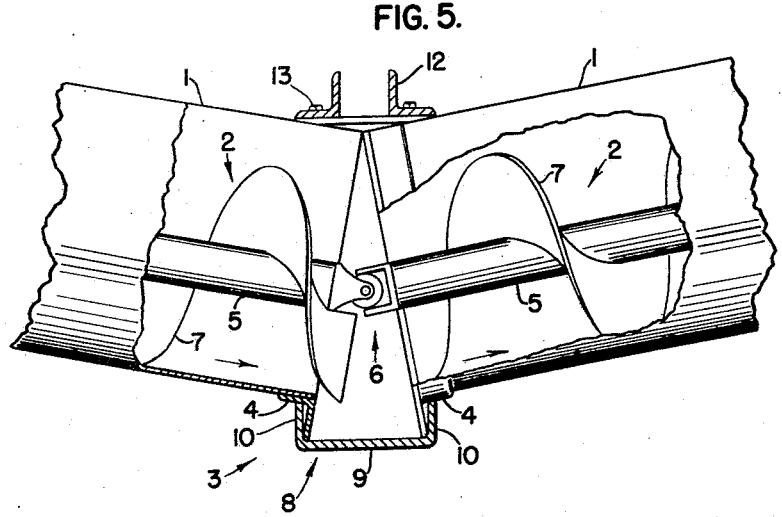
FIG. 5 is a view similar to FIG. 4 with the material flow being to an elevated position.

With the present joint construction, the angularity between the housing sections can be changed, as desired, without effecting the construction or operation of the clamping unit. The web portion of the strap 8 is of sufficient width to cover the space between the housing sections 1 regardless of whether the sections are disposed in an axially aligned relation, as shown in FIGURES 1 and 2, or disposed in an angular relation in a vertical plane, as shown in FIGS. 4 and 5, or disposed in an angular relation in a horizontal plane, as shown in FIG. 3.

The present invention provides a simple joint construction for joining the ends of conveyor housing sections and which can be readily applied to the sections. The joint construction permits the sections to be moved either in a vertical or horizontal plane, without effecting the clamping action and with the use of a single standard clamping unit.

Various modes of carrying out the invention are contemplated as being within the scope of the following claims particularly pointing out and distinctly claiming the subject matter which is regarded as the invention.

I claim:

1. A conveyor structure, comprising a pair of conveyor housing sections disposed in spaced end-to-end relation to provide an open joint therebetween, a flange formed on the adjacent ends of said housing sections and extending laterally outwardly of the respective housing sections, a conveyor member disposed within said housing sections and adapted to move a material within said sections, a generally U-shaped strap disposed outwardly of the housing sections and disposed across said joint, said strap having a pair of inwardly extending spaced flanges disposed longitudinally outward of the respective flanges on said housing sections to prevent longitudinal and lateral displacement of said housing sections, and means for securing the free upper ends of the strap together to clamp said strap to said housing sections.

2. A conveyor structure, comprising a pair of conveyor housing sections disposed in spaced end-to-end relation to provide an open joint therebetween, a flange formed on the adjacent ends of said housing sections and extending laterally outwardly of the respective housing sections, a conveyor member disposed within said housing sections and adapted to move a material within said sections, a strap having a configuration to complement the exterior surface of said housing sections and disposed around the joint and extending over said housing sections on either side of the joint, said strap having a pair of inwardly extending spaced flanges disposed longitudinally outward of the respective flanges on said housing sections to prevent longitudinal and lateral displacement of said housing sections, and connecting means securing the free upper ends of the strap together to clamp said strap to said housing sections.

3. A conveyor structure, comprising a pair of conveyor housing sections disposed in spaced end-to-end relation to provide an open joint therebetween, each of said housing sections having an open top, a flange formed on the adjacent ends of said housing sections and extending laterally outwardly of the respective housing sections, a conveyor member disposed within said housing sections and adapted to move a material within said sections, a strap having a configuration to complement the exterior surface of said housing sections and disposed around the joint and extending over said housing sections on either side of the joint, said strap having a pair of inwardly extending spaced flanges disposed longitudinally outward of the respective flanges on said housing sections to prevent longitudinal and lateral displacement of said housing sections, a plate secured to each upper free end of the strap and extending laterally therefrom, and a pair of connecting bars securing said plates together and extending over said housing sections, said bars straddling the vertical plane extending centrally through said joint.

4. A joint construction for connecting the opposed ends of externally flanged, open top conveyor housing sections, comprising a generally U-shaped strap adapted to be disposed around the joint between the conveyor sections, said strap having a central web and a pair of inwardly extending end flanges adapted to be disposed longitudinally outward of the corresponding flanges on the housing sections, a plate extending laterally outwardly from each free end of said U-shaped strap, and connecting means for connecting said plates together to clamp said strap to the housing sections, said connecting means being disposed in substantial vertical alignment with the end flanges of the strap to provide additional rigidity for the open top housing sections.

5. A conveyor structure, comprising a pair of conveyor housing sections disposed in spaced end-to-end relation to provide an open joint therebetween, each of said housing sections having a generally U-shaped cross section and having an open top, a flange formed on the adjacent ends of said housing sections and extending laterally outwardly of the respective housing sections, a conveyor member disposed within said housing sections and adapted to move a material within said sections, a generally U-shaped strap disposed outwardly of the housing sections and disposed across said joint, said strap extending substantially continuously from one upper edge of the housing sections around the bottom of said sections to the other upper end of said sections and said strap having a central web portion covering said joint and a pair of inwardly extending end flanges outwardly straddling the corresponding flange of said housing sections, a plate secured to each upper free end of the strap and extending laterally therefrom, and a pair of connecting bars securing said plates together and extending over said housing sections, said bars straddling the vertical plane extending centrally through said joint.

References Cited in the file of this patent
UNITED STATES PATENTS

| | | |
|---|---|---|
| 559,338 | Lorenz | April 28, 1896 |
| 1,689,963 | Pelton | Oct. 30, 1928 |
| 2,279,201 | Kozak et al. | April 7, 1942 |
| 2,349,016 | Stephens | May 16, 1944 |